United States Patent [19]

Iles

[11] 4,240,146
[45] Dec. 16, 1980

[54] INDICATING DEVICES

[75] Inventor: Christopher W. Iles, Newton Ferrers, England

[73] Assignee: Plessey Handel und Investments AG, Zug, Switzerland

[21] Appl. No.: 843,748

[22] Filed: May 26, 1978

[51] Int. Cl.³ .............................................. G07B 13/00
[52] U.S. Cl. ..................................................... 364/467
[58] Field of Search ......................................... 364/467

[56] References Cited

U.S. PATENT DOCUMENTS

| | | | |
|---|---|---|---|
| 3,931,508 | 1/1976 | Kelch | 364/467 |
| 3,937,933 | 2/1976 | Warkentin | 364/467 |
| 3,970,827 | 7/1976 | Ikuta et al. | 364/467 X |
| 3,983,378 | 9/1976 | Tammi | 364/467 |
| 4,001,560 | 1/1977 | Larsen | 364/467 |
| 4,051,913 | 10/1977 | Gudea | 364/467 X |
| 4,053,749 | 10/1977 | Shinoda et al. | 364/467 X |
| 4,081,663 | 3/1978 | Ahlberg | 364/467 |

Primary Examiner—Edward J. Wise
Attorney, Agent, or Firm—Fleit & Jacobson

[57] ABSTRACT

A charge indicating arrangement in the form of a taximeter is provided which is arranged to store a current tariff structure and a proposed tariff structure and which is provided with means for switching from one to the other at a required time e.g. a specified time and date on which the proposed tariff structure is required to take effect.

11 Claims, 1 Drawing Figure

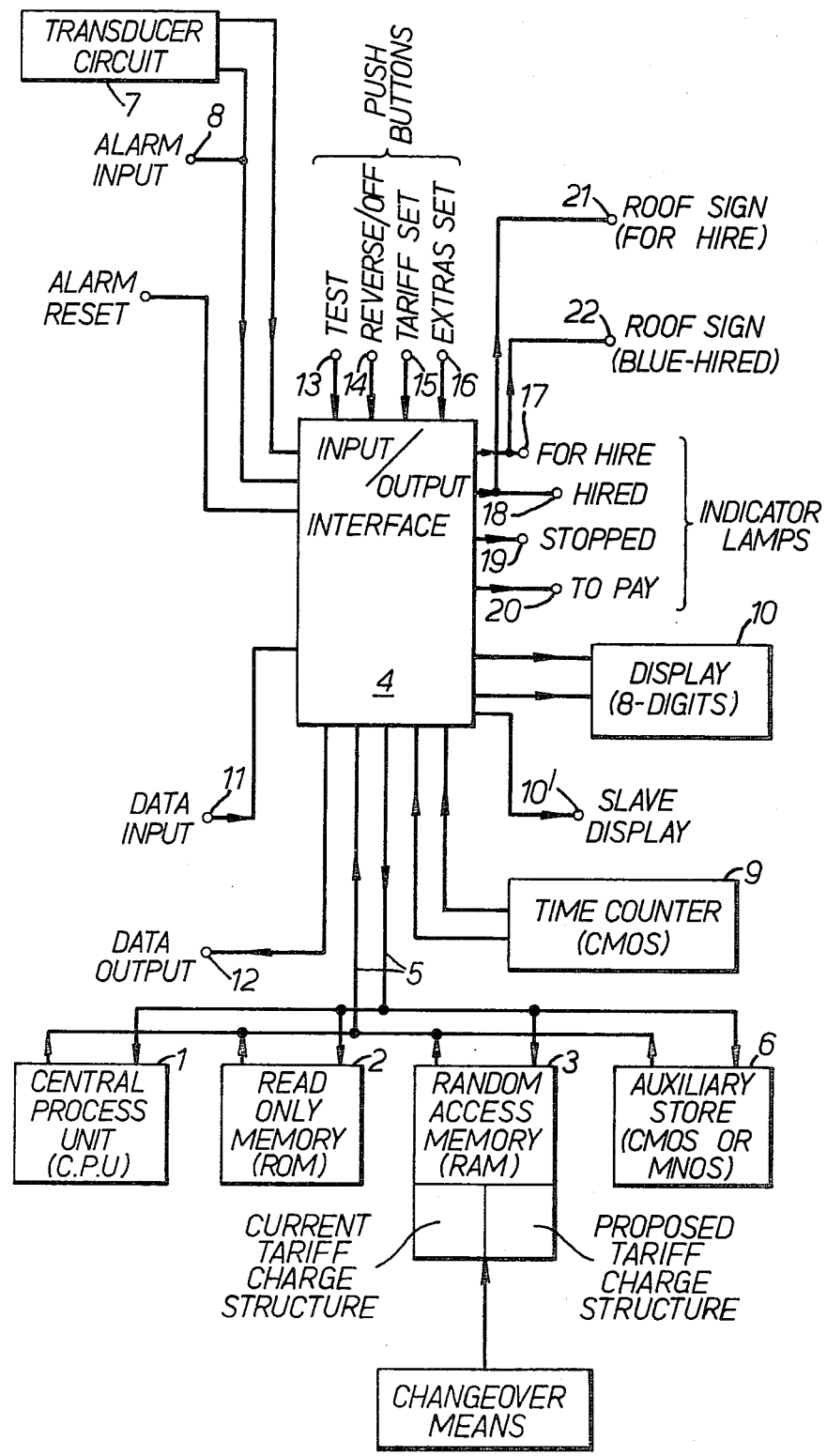

INDICATING DEVICES

This invention relates to indicating devices and relates more especially to charge indicating devices such as taximeters.

In our co-pending U.S.A. patent application No. 750,915 there is described a form of electronic taximeter. In such a taximeter there is an administrative problem caused when it is necessary to change the tariff structure relating to the various tariffs applicable to a particular area such as, for example, when a price increase becomes effective. It is obviously not possible to update all the taximeters simultaneously with a new tariff structure at the effective date and a situation is normally obtained where, when a new price structure is to be introduced, vehicles are issued with a chart by means of which the fare displayed on the taximeter may be converted to the actual fare in accordance with the new price structure. This procedure has considerable potential for abuse and also causes difficulty with people who do not speak the language of the area, and/or have difficulty in understanding the operation of the conversion table.

The charge indicating device of the present invention provides a taximeter which can be arranged to store a current tariff structure and a proposed tariff structure and which is provided with means for switching from one to the other at a required time, e.g. a specified time and date or on a suitable command.

In this way, it would be possible to progressively program all the taximeters of a particular area with a new tariff structure before the changeover time and the changeover can then be arranged to be implemented in all taximeters at the specified time or on receipt of the suitable command.

According to the present invention there is provided a charge indicating device comprising storage means for storing information relating to current charge structure in accordance with which a charge to be made is derived and for storing information relating to a proposed charge structure with means operable on the storage means for effecting a changeover from the said current structure to the said proposed structure at a required time.

In a preferred form the charge indicating device will take the form of a taximeter, in which a charge to be made is derived in accordance with a tariff structure information stored in the storage means.

In one arrangement for carrying out the invention, the changeover may be effected in accordance with time and date information stored in the storage means and may be effected the first time the taximeter is set to a 'FOR HIRE' mode following the elapse of the stored time and date.

In another arrangement for carrying out the invention, the changeover may be effected after the elapse of a specified time from the proposed tariff structure information is entered in the storage means.

In yet another arrangement for carrying out the invention the changeover may be effected in accordance with a received radio signal, the received radio signal conveniently having an enabling code associated with it which is conveniently stored in the storage means.

In yet another arrangement for carrying out the invention the changeover may be effected in accordance with a command signal keyed into the taximeter, the command signal being keyed into the taximeter using a control thereof. Conveniently the command signal has an enabling code associated with it which is stored in the storage means.

An exemplary embodiment of the invention will now be described, reference being made to the lone figure which is a block schematic diagram of a charge indicating device in accordance with the present invention in the form of a taximeter.

In computing the fare to be charged during the hired period of a taxi, a taximeter uses as a basis a distance measurement and/or, when the speed of the taxi falls below a pre-determined threshold, a time measurement. The distance measurement may be derived from a transducer circuit e.g. a proximity detector which affords a logic change, the duration between logic changes representing a defined increment of vehicle movement. The time measurement may be derived from a crystal oscillator. The taximeter uses these distance and time increments to compute the fare to be charged in dependence upon a tariff charge structure that is in force at the time of the hiring.

Both the current and the proposed tariff structures are made up of a number of constants some or all of which will vary from tariff to tariff and typically these may be listed as follows:
 (a) extras increment
 (b) base cost per unit of distance and of time. This may include a pre-charge
 (c) surcharge cost per unit i.e. above a fare threshold
 (d) increased fare threshold
 (e) fare increment
 (f) minimum speed threshold
 (g) start of night tariff
 (h) end of night tariff
 (j) Unit/distance ratio The invention of the present application although applicable in principle to any form of taximeter, is more easily implemented in the form of electronic taximeter that forms the basis of co-pending U.S.A. patent application No. 750,915 the subject matter of which is laid open to public inspection in corresponding German patent application P 26 56 848.9 as of 23rd June, 1977. In the taximeter of this application, the tariff charge structure information relating to the various tariffs currently in force is stored in a random access memory and a facility is provided whereby use may be made of a data input terminal, which in the preferred form is of optical form, to change the tariff charge structure information.

In the lone FIGURE, there is shown in block schematic form an electronic taximeter in accordance with the present invention which lends itself to construction using large scale integration (L.S.I.) semiconductor techniques. The taximeter shown consists of a microprocessor in the form of a central process unit (CPU) 1, a read-only memory (ROM) 2, a random access memory (RAM) 3, a changeover circuit 4, all of which are coupled to an input/output interface 50 by means of a common bus 5. The central process unit (CPU) 1 carries out all the required computation of the taximeter under the control of information contained in the ROM 2 and the RAM 3. The ROM 2 is used to store all the fixed information, firstly relating to the programme in accordance with which the CPU 1 operates, and secondly relating to the various fixed constants used in the computation of the fare to be charged. The RAM 3 is used to store all the transient information i.e. the information relating to the pre-charge, the base unit cost and the surcharged unit cost constants that vary from tariff to tariff and also information relating to various accumulated totals e.g. the number of trips made, the number of units clocked up, the total number of miles or kilometers covered, the engaged number of miles or kilometers covered, the extras total and the fares total. This latter information is usually required by the taxi owner to be able to supervise the operation of the taxi and its income.

In accordance with the present invention, a portion 43 of the RAM 3 is dedicated to storing the current tariff charge structure and a portion 53 of the RAM is dedicated to storing the proposed tariff charge structure. The changeover 4 is responsive to an enabling signal received on bus 5 for causing the RAM to read out the proposed tariff charge structure in place of the current tariff charge structure. The changeover takes place at a time and date that may also be stored in the random access memory, when the proposed tariff charge structure information is inserted via a data input 11.

The distance increments required by the taximeter in order to compute the fare to be charged takes the form of a transducer circuit 7 which is associated with some moving part e.g. wheel of the taxi. The transducer circuit 7 may take any convenient form e.g. a proximity detector, but conveniently may take the form of the transducer arrangement that forms the basis of our copending G.B. patent application No. 50995/75 and preferably affords an output indicative of the transducer having been tampered with as disclosed therein. The output afforded by the transducer circuit 7 together with an alarm input 8 are applied to the input/output interface 50 together with the output from a time counter 9, which is preferably of CMOS form and which affords the time increments which together with the distance increments are used by the CPU 1 in conjunction with the stored information to compute the fare to be charged. A visual indication of the fare computed by the CPU 1 is afforded by a display unit 10 which may typically comprise an 8-digit numerical display, each digit of which may conveniently consist of a seven segment LED (light emitting diode) element, five of the eight digits being used to indicate the fare to be charged in say pounds and pence, two of the digits being used to indicate the extras total and one digit being used to indicate the tariff in force at the time. Alternatively, a liquid crystal display may be used. In addition to the display 10, an output 10' is provided for driving a slave display which may, for example, be placed in the passenger compartment of the taxi.

Information relating to the constants of each of the tariffs are normally determined by some regulating body such as the Public Carriage Office in Great Britain or an authorized agent, and a data input 11 is provided where the current and the proposed tariff structures may be read-into the RAM 3. It is normally required that this input be sealed by the regulating body so that the information cannot be changed without their authority. In the present instance, it is envisaged that this sealing be carried out electrically be arranging that each taximeter or a group of taximeters are afforded with code words which are known only to the regulating authority and which may be used to gain access to the RAM 3 and also, if required mechanically by using say a lead seal which may also be the seal used for ensuring that the taximeter is not opened by other than the regulating authority.

As well as providing the regulatory data input, it may be necessary to provide the taxi owner with means for gaining access to the accumulated totals stored in the RAM 3, and it is envisaged that this may be done by making use of the display 10, but also by providing a data output 12 from which the stored data is obtained either by operation of the taximeter controls (yet to be described) or by making use of the data input 11 again possibly making use of a code word for access purposes.

Day-to-day operation of the taximeter is effected by means of four push-buttons referenced 13, 14, 15 and 16 respectively, these being assigned the functions "test", "reverse/off", "tariff set" and "extras set" respectively, the use of which is more fully explained in copending U.S. application No. 750,915, and the condition of the taximeter at any time is indicated by four lamps referenced 17, 18, 19 and 20 respectively which form an integral part of the taximeter, which indicate the conditions "For Hire", "Hired", "Stopped" and "To Pay" respectively, as is also described more fully in copending U.S. application No. 750,915. Additionally, the "For Hire" lamp 17 is provided with a parallel output 21 for connection to a "For Hire" roof sign, and the "Hired" lamp 18 is provided with a parallel output 22 for connection to a blue "Hired" roof sign.

In the taximeter depicted in the lone Figure, it is envisaged that the transfer of data to and from the meter would in a preferred form be carried out optically using, for example, optical fibre techniques. One such technique is more fully described in copending U.S. application No. 750,915. As has been mentioned previously, in order to limit access to the regulatory data input to some regulating body or authorized agent, it is envisaged that the data input 11 may have associated with it a coded "word" which is unique to one or a small group of taximeters and which is known only to the regulating body or authorized agent so that unauthorized access thereto is impossible. In addition, it is envisaged that the data input 11 be provided with a mechanical e.g. lead seal which must be broken to gain access to the tubular member, in which case, it may also be arranged that removal or movement of the seal so as to allow light to impinge the optical part of the data input 11 which will cause an internal and/or external alarm to be activated.

Similarly, it is envisaged that the transfer of information via the data output 12 be carried out optically; again using a code "word" for access purposes.

By arranging that taximeters are automatically updated to a new tariff structure in this way, it is possible that the situation will arise where a change in tariff structure is implemented in the middle of a hire period. This is often not in accordance with prevailing regulations or may otherwise be considered undesirable, and it is proposed that this may be overcome by arranging that the actual changeover to a new tariff structure is not effected at the specified time, but is effected, for example, when the taximeter is switched to the "For Hire" mode the first time after the specified time. In this way, a hire that commences just before a specified time for a tariff changeover, will continue to be charged in accordance with the "old" tariff structure. This may be achieved by arranging that each time the taximeter is switched to the "For Hire" mode, the real time/date is compared with a time/date or time/date code stored in the taximeter at the time the taximeter was programmed with the revised tariff structure. The first "For Hire" selection after the specified time/date has elapsed will cause the taximeter to be switched to the new tariff structure.

Instead of feeding the taximeter with the real time/date on which a tariff changeover is to be effected, it may be arranged that at the time the taximeter is loaded with the new tariff structure, the time difference (in, say, hours and minutes) between the time of loading and the desired introduction time is determined and this time difference is set into a change-over counter 51, say, in the taximeter. The counter may then be decremented to zero to determine when the tariff changeover should be effected.

In the above described embodiment it is required that the effective time of introduction of a new fare structure is stored within the taximeter. It is envisaged however that the changeover may be effected in other ways, such as by means of a radio signal that is either received by a radio receiver associated with the taximeter or by the usual radio receiver 52 (shown in phantom) carried by taxis. On the receipt of the necessary radio signal, which may be identified by a suitable enabling code that may be applicable to one or more taximeters, it is arranged that the enabling signal is fed into the data input 11 and the taximeter is operated to cause the changeover from a current tariff structure to a proposed tariff structure to be effected.

Yet a further method of effecting the required tariff changeover, and one that has certain advantages over the other ways described, is to make use of the taximeter (push-button) controls 13-16 to key in a command signal to cause the changeover to be made. Each taximeter or group of taximeters may be provided with an enabling code stored in it which must be keyed into the taximeter before a changeover command is accepted. The enabling codes and proposed time of changeover may be supplied to the various taxi drivers affected, in advance of the introduction time so that the command signal can be keyed into the taximeter by the taxi driver at the required time. It may be arranged that the actual time the changeover was effected be stored in the taximeter.

What we claim is:

1. A taximeter comprising:
  processing means for calculating a taxi fare;
  random access memory means having first and second memory areas for storing tariff information;
  date input means operable under the control of the processing means for loading the first memory area with said tariff information relating to a first tariff and for loading the second memory area with said tariff information relating to a second tariff;
  coupling means for coupling the first memory area with the processing means so as to enable the processing means to calculate a taxi fare in accordance with the first tariff; and
  changeover means operable in response to a predetermined command signal for coupling the processing means with the second memory area so as to enable the processing means to calculate thereafter a further taxi fare in accordance with the second tariff.

2. A taximeter as claimed in claim 1, wherein the changeover means enables the processing means in accordance with time and date information stored in the storage means.

3. A taximeter as claimed in claim 2, wherein the changeover means enables the processing means the first time the taximeter is set to a 'FOR HIRE' mode following the elapse of the stored time and date information.

4. A taximeter as claimed in claim 1, wherein the changeover means enables the processing means after the elapse of a specified time measured from the time when the proposed tariff structure information is entered in the storage means by the data input means.

5. A taximeter as claimed in claim 1, wherein the changeover means enables the processing means in accordance with a received radio signal.

6. A taximeter as claimed in claim 5, wherein the received radio signal includes an enabling code.

7. A taximeter as claimed in claim 6, wherein the enabling code is stored in the storage means.

8. A taximeter as claimed in claim 1, wherein the changeover means enables the processing means in accordance with a command signal keyed into the taximeter.

9. A taximeter as claimed in claim 8, wherein the command signal is keyed into the taximeter using a control of said taximeter.

10. A taximeter as claimed in any one of claims 8 and 9, wherein the command signal includes an enabling code.

11. A taximeter as claimed in claim 10, wherein the enabling code is stored in the storage means.

* * * * *

UNITED STATES PATENT AND TRADEMARK OFFICE
CERTIFICATE OF CORRECTION

PATENT NO. : 4,240,146
DATED : December 16, 1980
INVENTOR(S) : CHRISTOPHER WILLIAM ILES It is certified that error appears in the above—identified patent and that said Letters Patent is hereby corrected as shown below:

On the title page, insert

-- (30) Foreign Application Priority Data

October 22, 1976 United Kingdom ..............43866 --

Signed and Sealed this

Nineteenth Day of May 1981

[SEAL]

Attest:

RENE D. TEGTMEYER

Attesting Officer

Acting Commissioner of Patents and Trademarks